United States Patent

Johann

[11] 4,204,781
[45] May 27, 1980

[54] CLAMPING TOOLHOLDER

[75] Inventor: Maier Johann, Reutte, Austria

[73] Assignee: Schwarzkopf Development Corporation, New York, N.Y.

[21] Appl. No.: 950,376

[22] Filed: Oct. 11, 1978

[30] Foreign Application Priority Data

Oct. 12, 1977 [AT] Austria .................................. 7277/77

[51] Int. Cl.² ............................................... B26D 1/12
[52] U.S. Cl. ..................................................... 407/105
[58] Field of Search .................................. 407/104, 105

[56] References Cited

U.S. PATENT DOCUMENTS

| 3,456,315 | 7/1969 | Stier | 407/104 |
| 3,546,758 | 12/1970 | Stier | 407/104 |
| 3,854,183 | 12/1974 | Roos | 407/104 |

Primary Examiner—Harrison L. Hinson
Attorney, Agent, or Firm—Morgan, Finnegan, Pine, Foley & Lee

[57] ABSTRACT

A disposable insert is retained in a toolholder recess by a downwardly biased pin element having a head part which abuts laterally against the insert hole wall and against two points of a projection extending into the insert hole.

5 Claims, 3 Drawing Figures

CLAMPING TOOLHOLDER

BACKGROUND OF THE INVENTION

The invention relates to a clamping toolholder, which comprises a shank with a recess for the support of a base plate and a disposable insert of the pin-type and also a clamping mechanism which includes a bushing, retained in a shank bore below the recess, and a clamping element having one part extending into the bushing and another part into the insert hole, so that the clamping element is supported within the bushing and is movable in the direction of the axis in a manner such that the movement is against forces preferably caused by cup springs.

A plurality of clamping systems are known. According to one approach, the pin-type inserts are clamped against one or several side walls of the shank recess by a clamp element that extends into the insert hole. The plate clamping takes place, for instance, by the turning of an eccentric pin or a pin system, consisting of one or several parts movable against one another. In other toolholder systems the clamping of a disposable insert takes place by a tipping of the pin, for instance, by an elbow lever system.

In toolholders with an eccentric pin, it is perceived as disadvantageous that the pin system has to be prepared very precisely. Because great forces have to be transmitted on the shank, the system must have a precise leading in the bore of the toolshank and needs great height in construction. Additionally, the tolerances of the dimensions of disposable inserts have to be small to guarantee a satsifactory clamping. Eccentric pins are regularly twisted by a hexagonal, hollow, socket, which causes problems in the use of the system. The hexagonal socket in the pin is often contaminated or blocked by chips. Preferably, in cases of small socket dimensions, a considerable abrasion by radiusing of the hexagon is given, which entails an overflow of the socket.

Clamping toolholders, with a pin tilting system are expensive to construct and produce. To obtain a sufficient clamping effect by tipping, the three distinguished equipment points for clamping, for instance in an elbow lever, should be located far away from each other.

Due to this remarkable bending, strains result in the clamping system. Also, in this case a satisfactory clamping with precise positioning of the inserts can be obtained only by very precise fabrication to guarantee that the predetermined equipment points of the elbow lever lie close to the cutting insert and recess of the shank.

It is known that the clamping of a cutting insert depends upon the established moment of rotation by the operator. This has a disadvantageous effect on the pin-type clamping with eccentric stud on the end because every established moment of rotation causes the end position of the eccentric to be different. For this reason, the clamping often does not occur in the predetermined direction.

In the past, clamping systems with cup springs have been prescribed, which render a clamping action, uneffected by the operator. According to such a construction, a bushing is screwed into a bore in the shank below the insert. Inside the bushing is a pin, which can be stretched by cup springs in the direction of the axis. The clamping of the cutting insert occurs with the pin through a system of levers which cause the pin to rest with one point at the inner wall of the insert hole and with two points at the screwed bushing. Even with that clamping arrangement one cannot warrant a precise clamping. Additionally, the height of construction is comparatively great, due to the arrangement of the three-point-support on top of the spring seating.

SUMMARY OF THE INVENTION

In contrast to the state of the art, the present invention has as its object the creation of a clamping system which is simple in construction and comparatively inexpensive to produce. The clamping system is suitable for the clamping of disposable inserts used in turning and in milling cutters. According to the present invention, all clamping points of the clamping system are within a close area. Further, the inevitable tolerances, as well as the clamping mechanism on the recess and boring of the shank and cutting insert, have a minimized influence on the actual clamping.

The precision of the clamping should be governed by the precision of the production of the clamping element itself, and by the summation of no more than three tolerances in size. The pin-type clamping should be insensitive of the handling so that the clamping occurs with sufficient certainty in the predetermined direction. The clamping mechanism should be feasible for negative, as well as for positive, rake inserts. Due to a low height of construction, the clamping element should be applicable for tool-holders of amall shank dimensions of the type used, for example, for the internal copyturning. The clamping has to be sufficiently reliable against turning or loosing of the insert during machining.

The inventive clamping toolholder for pin-type cutting inserts is thus characterized that the cylindrical bushing contains at its upper end a border with a lap and a central bore. The bushing has a prolongation, beginning at the above-mentioned border and ending in the insert hole, preferably in that part of the hole close to the insert point just under use. The prolongation of the bushing has a symmetry plane, which concurs at least approximately with the normal direction or the resultant of normals of one or two adjoining planes of the lateral recess wall and the insert. The clamping element consists of a pin, which occupies the central boring of the border of the bushing, and a head part of toroidal shape, located in the insert hole. The prolongation has a curved shape in the area next to the head part, to permit the head part to adjoing itself to the prolongation of two points, which include an angle of 120° with the axis of the pin, and to the inner wall of the insert hole at one point.

DETAILED DESCRIPTION

Figure 1:
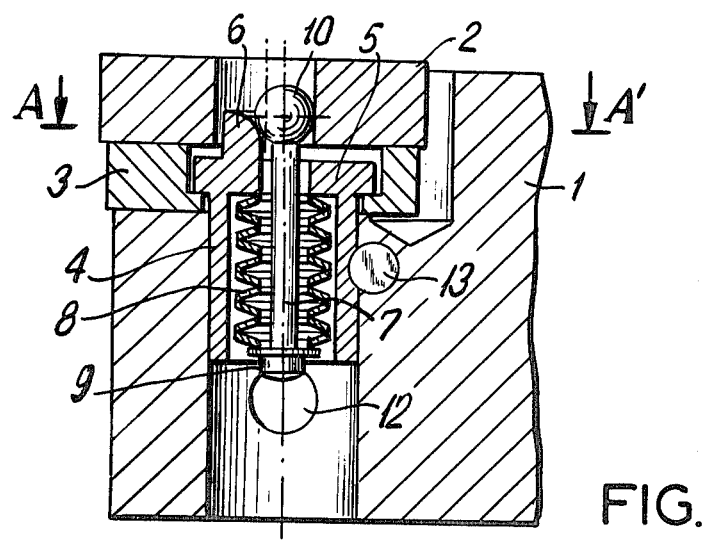
FIG. 1 is a fragmentary, cross-sectional view of a preferred embodiment of the inventive clamping toolholder taken along its plane of symmetry and illustrates the exposure of negative rake cutting insert with square base.
Figure 3:
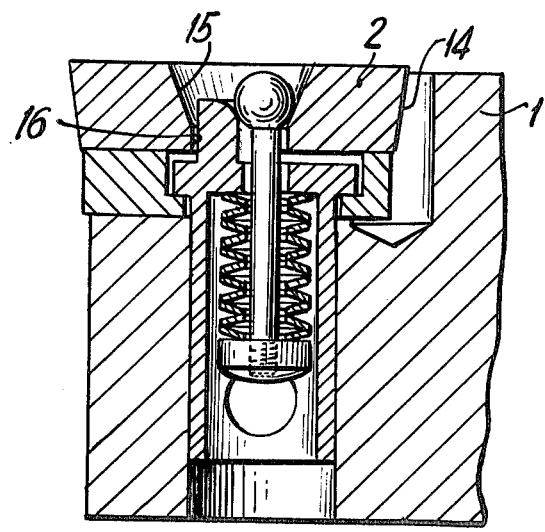
FIG. 3 is a fragmentary, cross-sectional view, similar to FIG. 1, and illustrating the clamping with a positive rake insert.

FIGS. 1 and 3 show negative and positive cutting inserts embodiments, respectively, of the inventive clamping holder. With particular reference to FIG. 1, the holder comprises a tool-shank, a pin-type insert with an underlying support plate 3. The pin-type clamping mechanism includes a bushing 4, press fit in a shank bore below the cutting insert. The bushing is secured against torsion with a pin 13. Bushing 4 has an upper border with a lap 5. The support plate 3 is locked with lap 5. The prolongation 6 of the bushing begins at the border and reaches into the lower area of the central hole of the cutting insert. The clamping mechanism, operated with cup springs 8, includes a pin 7, pervading the central boring of the border, a part 9, used as a bearing for the cup springs, for instance a locking washer, and a heatpart 10. The headpart 10, can be spherical, as shown in FIG. 1, but it can also have the form of a truncated cone or the form of a pear.

The replacing and the clamping of the cutting insert is as follows: One end of an eccentric key is directed through a lateral opening 12 into the shank bore below the bushing of the clamping element. The clamping element is lifted by turning the eccentric key through a half turn. This causes the unseating of the headpart 10 from the wall of the insert hold and the cutting insert can be lifted. By turning the eccentric key through another half turn, the clamping element is moved down by spring force and the cutting insert is clamped again.

Because of the specific structure of the internal surface 11 of the bush prolongation, the head part 10 of the clamping element is always adjoined along two points of contact during lowering the clamping element. Thus, the contact of the head part 10 with the internal wall of the insert hold takes place at a predetermined position. The two adjoining points between prolongation 6 and head part 10 include an angle of 120° with the axis of the pin, which is part of the clamping element. A slight tilting of the clamping element during lifting in the direction of the bushing prolongation 6 can be reached securely because the lateral seating areas of the cup springs, namely the bushing border and the locking washer of the clamping element don't lie in its clamped position parallel with one another, but provide an adequate angle.

Concerning the construction of the internal area of the bushing 6 prolongation next to the head part 10 of the clamping element, it has to be provided, that the tangential plane at the point of contact between the head part and the internal area of the bushing prolongation encloses an acute angle of preferentially 20° with the axis of the insert hole in the clamped position. In that way there is provided a good force-locking of the cutting insert with the lateral walls of the shank recess, as well as with the support plate.

In accordance with the desire to be able to use a bushing with constant wall thickness, the axis of the insert hole must lie in front of the axis of the shank bore, as viewed from the bush prolongation.

Figure 2:
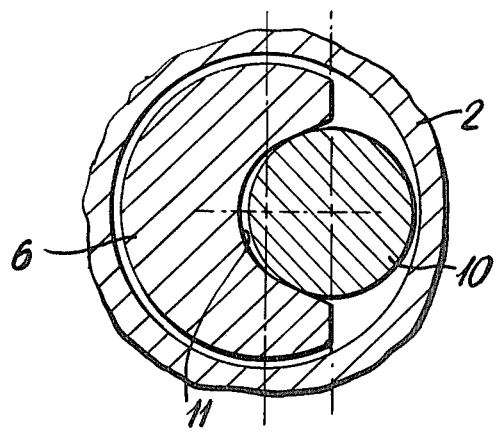
FIG. 2 is an enlarged, cross-sectional view of the clamping mechanism of the toolholder taken generally along the line A—A' in FIG. 1, in the area of the hole of the disposable insert, and shows the adjoining points of the headpiece in contact with the internal surface of the bushing prolongation.

FIG. 2 illustrates the profile of the internal area of the bushing prolongation 6, which is used to support the head part 10. The parabolic section profile within the part of the internal area between the seating points of the head part is unaltered in a wide range of heights. The curvature top of the profile moves with change of height on a curved line, which can be devised from the sectional picture of FIG. 1.

FIG. 3 shows an embodiment of the inventive clamping toolholder for positive cutting inserts. To achieve a good force-locking between the cutting insert 2 and the shank 1, the hole wall 15 of the disposable insert is conical at its upper part. The lower part 16 of the hole wall of the disposable insert is cylindrical, advantageously, to assure usability in conventional toolholder systems too. The design of the inventive clamping holder, as shown in FIG. 3, differs from the design shown in FIG. 1 in that the bushing extends further downwardly to the actual clamping element, and that the eccentric key, for releasing the clampint system, is introduced laterally through a hole in the bushing.

The inventive clamping toolholder distinguishes itself from others by simply structured elements. The clamping mechanism can be exchanged quickly and relatively cheap as a whole.

Thus, the adjoining points lie within a small area within the hole of the cutting insert, excepting the adjoining of the cutting insert at the shank, with the result that essential disadvantages of known clamping toolholders with clamping in the insert hole are avoided.

The usual three-point-clamping with effort arms between the seating points of the clamping pin, sets up problems by the fulfillment of dimensions limits, preferably then, when manufacturing irregularities in the production of shank recess, shank bores of disposable inserts, are superposed by irregulations, concerning the pin dimensions.

The seat of the plates within the clamping toolholder is unexpectedly good. During turning unwanted chattering does not occur, nor do the cutting inserts climb. The force-locking between the disposable insert and the clamping holder shank is even completely satisfactory in cases in which the forces from the workpiece to the cutting insert have to be transferred out of divergent directions, far away from the ideal direction, that is the resultant of normals to the shank-insert adjoining points. The inventive clamping holder system is therefore suitable for copy turning. The comparatively low total heights is moreover an advantage for this employment.

The inventive clamping holder system is also suitable for taking up rhombic and triangular disposable inserts. Owing to the guidance of the head part in the internal surface of the bush prolongation, there is assured even for triangular inserts with a one-sided adjoining a precise position and arrest.

The inventive clamping holder is suitable for taking up all usually used sizes of disposable inserts. The lower limit, from which on the inventive clamping system gets too filigreed and with this too expensive for production, is of no practical importance.

The inventive clamping toolholder can be used as well for turning tools as also for milling tools.

The exchange of the disposable insert is technically and operatingly very easy to handle. It allows this clamping system to be used in equipment for automatically insert change. The lifting of the clamping element for change of the disposable inserts could take place from below through the shank bore.

I claim:

1. A clamping toolholder comprising (i) a shank with a recess for the support of a base plate and a disposable insert of the pin-type and (ii) clamping means included (iii) a bushing fixed in a shank bore below said recess, and (iv) a clamping element having one part extending into the bushing and another part extending into the insert hole, so that the clamping element is supported within the bushing and movable in the direction of the axis thereof; means biasing said clamping element in the direction away from said recess; said bushing including at its upper end a border with a lap and a central bore and a prolongation beginning at said border and extending upwardly to be in the insert hole, the prolongation of the bushing having a symmetry plane, which concurs substantially with the normal direction or the resultant of normals of one or two adjoining planes of the lateral recess wall and the insert; said clamping element including a pin pervading the central boring of the border of the bushing, and a head part of toroidal shape, located to be in the insert hold; and the prolongation in its surface area next to the head part having a curved shape to permit the head part to adjoine itself to the prolongation at two points, which include an angle of 120° with the axis of the pin, and at one point on the inner wall of the insert hole.

2. The clamping toolholder according to claim 1, wherein the head part of toroidal shape has a spherical shape.

3. The clamping toolholder according to claim 1, wherein the head part of the toroidal shape has the shape of a truncated cone.

4. The clamping toolholder according to the claims 1, 2 or 3, wherein the angle between the tangential plane of the curved prolongation in its adjoining point with the head part of the clamping element and the axis of the shank boring is acute.

5. The clamping toolholder according to the claims 1, 2, or 3, wherein the axis of the insert hole is located in front of the axis of the shank boring with view from the prolongation.

* * * * *